Aug. 4, 1942.   R. T. ERBAN   2,292,066
FRICTION TRANSMISSION MECHANISM
Filed Nov. 17, 1939   3 Sheets-Sheet 1

INVENTOR
Richard Erban

Aug. 4, 1942.　　　　R. T. ERBAN　　　2,292,066
FRICTION TRANSMISSION MECHANISM
Filed Nov. 17, 1939　　　3 Sheets-Sheet 2
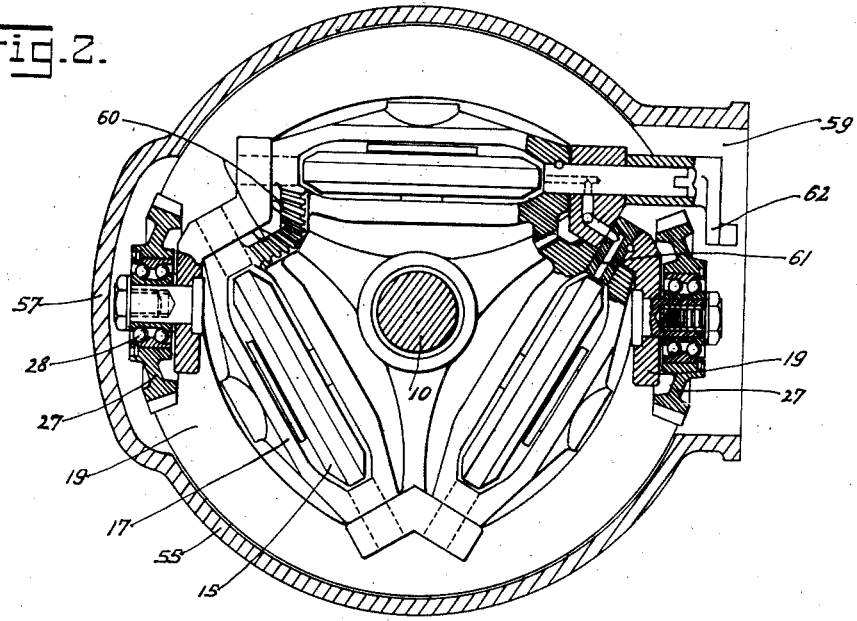
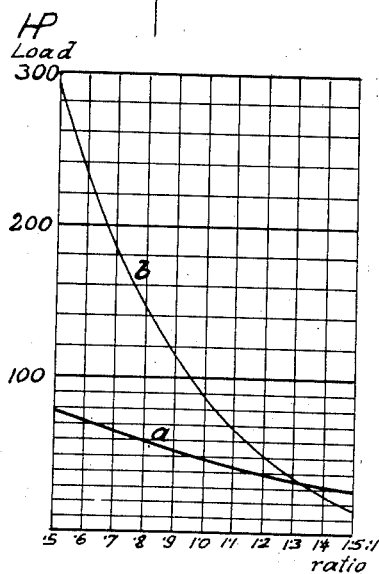
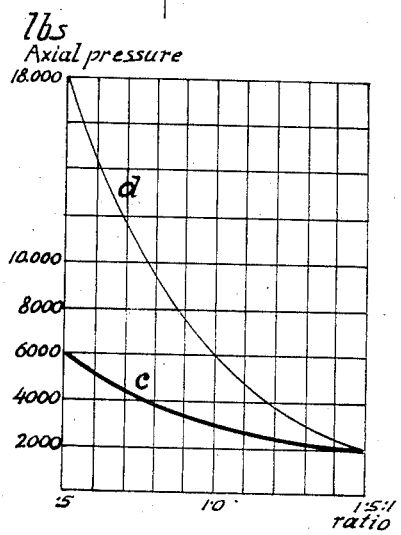
INVENTOR
Richard Erban

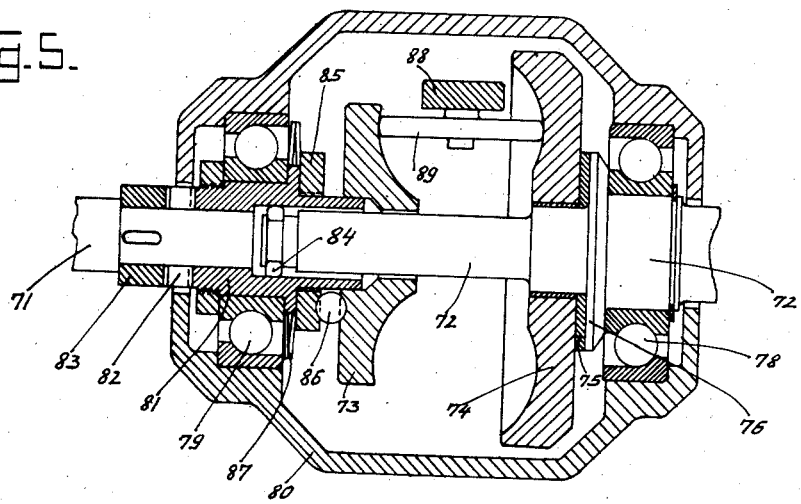
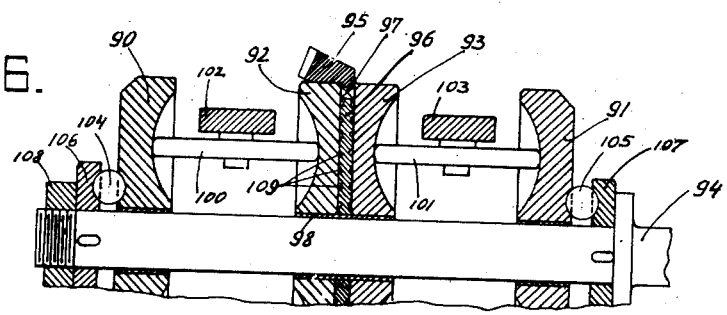
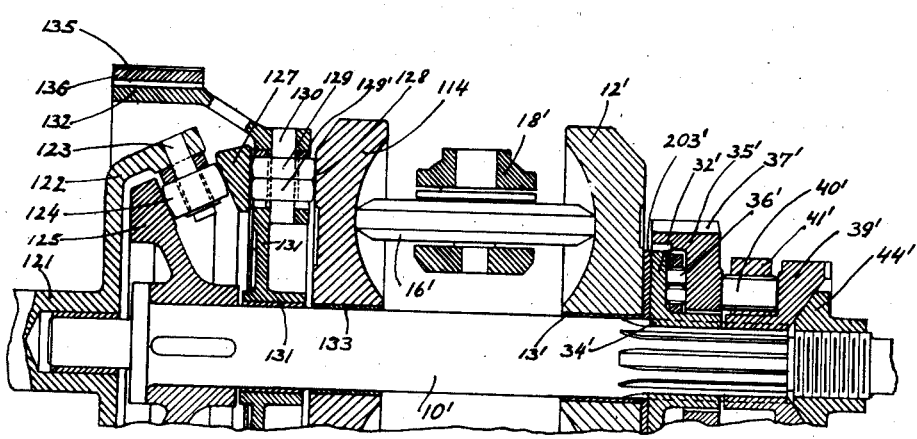

Patented Aug. 4, 1942

2,292,066

UNITED STATES PATENT OFFICE 2,292,066

FRICTION TRANSMISSION MECHANISM

Richard T. Erban, New York, N. Y.

Application November 17, 1939, Serial No. 304,914

16 Claims. (Cl. 74—200)

This invention relates to variable speed transmissions and more particularly to transmissions to be used in automobile vehicles.

Considerable difficulties have been encountered in the attempts to build an infinitely variable friction transmission for the relatively high powered motor cars of today. Transmissions in which the race and roller system transmits the full engine power at all times, cause difficulties due to high temperatures as a result of the losses incidental to the transformation of a great amount of energy, usually about 90 to 150 H. P., at an efficiency that is rarely over 92%, and with an insufficient surface to disperse the heat. These high temperatures cause increased fatigue of the race and roller material, shorter life, difficult lubrication, etc. Other serious problems arise from the requirement of a correct torque loading characteristic, and most of the designs proposed so far in an attempt to approach the required pressure curve, show excessive pressures for all but a very limited ratio range, thereby greatly adding to the difficulties already existing due to the heavy loads of 90 to 150 H. P.

Other attempts have been made to circumvent these difficulties by using a design known as a differential transmission, wherein a planetary gear is so combined with a variable speed system, that for the highest speed of the output shaft, the load upon the variable speed system is only a portion of the total load, while the main portion thereof is transmitted through the planetary gear. However, these desirable conditions exist only within a very narrow range of speed ratios, and already at a speed ratio about 40% below the maximum speed, the variable system must transmit 100% of the engine power. For still lower output speeds, the load upon the variable system increases still further to a multiple of the input power, so that the difficulties are worse than with the type of transmission above mentioned.

The present invention has therefore among its objectives a transmission which avoids these difficulties by creating a power-shunt system, in which a portion of the engine power is always by-passed around the variable speed system, at all ratios, so that the load of the latter is at all times much smaller than the full engine power. In other words, whereas the combination of a planetary gear and a variable roller system, known as a "differential system," produces a load internal with said system, also known as "circulating power," the present invention attains its objective by creating a new relationship of a variable system and a planetary gear, wherein a mechanism is provided to by-pass a portion of the power, transmitting it in parallel to the variable system, thereby preventing the formation of any "circulating power" which would increase the load.

Another objective of this invention is to obtain a torque-loading characteristic which closely follows the curve for the required pressure for maintaining frictional engagement between the races and the rollers in transmissions having races with toroidal surfaces, also called of the toric type, and whereby such torque loading device shall be of simple design and free from delicate adjustment means.

Where it has been attempted to attain a contact pressure between rollers and the races which more nearly approaches the required pressure, through the use of means producing a pressure in proportion to the load transmitted by said races, in combination with a system of springs in parallel thereto, or through the use of cams of a wedging angle that varies for different deflections, such attempts fell far short of the desired objective; the parallel spring system mentioned compensates the torque loading device only for one definite amount of power transmitted and is insufficient for any greater amount, while the effectiveness of a cam with varying angle depends upon the deflection of the transmission, which in turn varies with the power transmitted; in addition, the adjustment of a cam means with varying angle is rather delicate and its reliability uncertain.

According to this invention, the desired objective is attained with a simple torque loading device of substantially constant cam angle, which is responsive to the load transmitted through the by-pass mechanism, which forms the power-shunt to the variable system and supplemented by the load of the variable system.

A further objective is the construction of novel means for reducing the effect of shock loads upon a friction transmission; this objective is attained by providing an inertia controlled yieldable dampening means between the races to be protected from the effects of shockload and the other elements of the transmission to which said races are connected. These yieldable means are rendered effective by the pressure of the torque loading device, and therefore the transmitting capacity varies in accordance to the load, within predetermined limits. The inertia of the race will cause a yielding movement, or relative rotation, of the race with respect to the shaft, whenever the accelerative or decelerative forces due to shockloads exceed the torque capacity of the damper disc. It is this yielding movement which protects the rolling contact between the race and the roller from damage.

Another objective of this invention is a new construction of a variable speed transmission of the so called double-toric race and roller type, wherein novel means are employed to control the distribution of the load between the two toric systems that work in parallel in the transmission, and to prevent oscillation or surging of the power between the two systems.

Heretofore attempts have been made to control load distribution between the two halves of a double-toric (also called duplex)-transmission, either by providing means for preventing any relative rotary movement between corresponding races, or it was proposed to interpose a differential between two corresponding races so as to act as an equalizer. Both arrangements have caused difficulties through oscillations and surges of power between the two corresponding halves of the transmission, which should share equally in the load.

I attain the objective above outlined by arranging at least one pair of corresponding races so that the two races are capable of rotatable movement relatively to each other, and by providing a yieldable connection and dampening means for at least one race.

In another aspect, this new construction of a double-toric transmission contemplates a new method and means for driving the center race, or races, whereby any radial load upon the bearing of this center-race is avoided, while both systems of tiltable rollers are freely accessible for operating their ratio changing means and for holding the roller carriers against rotation around the transmission axis. This is accomplished by providing several substantially symmetrically arranged gear drives, preferably of the spiral bevel type, meshing with a ring gear upon the center-race on one side and with a ring gear mounted coaxially with one of the end races on the other side.

These and other objectives, as will appear in the following specification, are illustrated by way of example in the drawings, in which Fig. 1 is an axial section of the transmission.

Fig. 2 is a cross section of the transmission along the line A—A of Fig. 1.

Fig. 3 is a load comparing chart.

Fig. 4 is a chart showing axial pressures at various ratios.

Fig. 5 is a part of an axial section of a transmission embodying a shock limiting device.

Fig. 6 is a partial section of a double toric transmission.

Fig. 7 is a part of an axial section of a single-toric transmission with a power-shunt characteristic.

Figure 1:
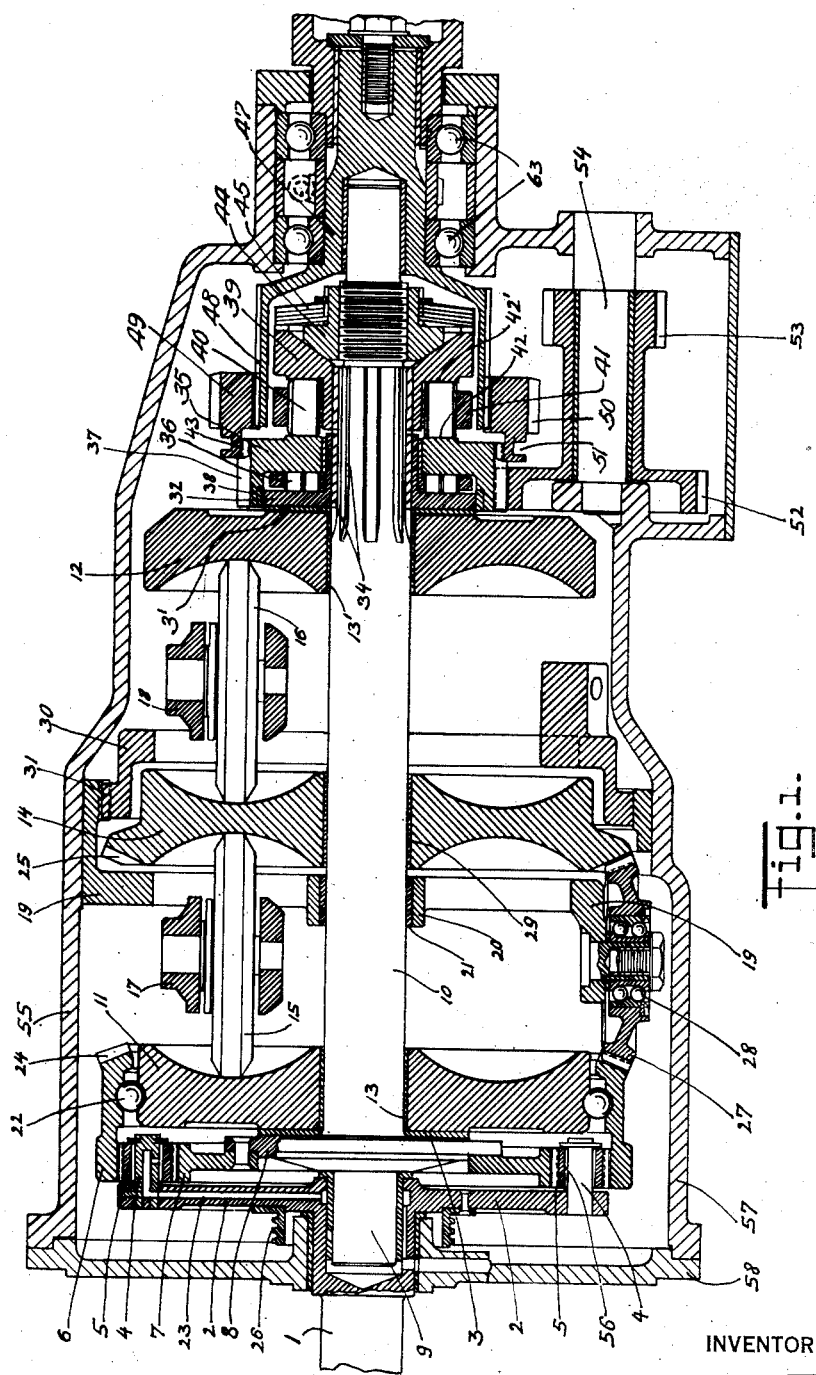

In the transmission shown in Fig. 1, two sets of tiltable rollers, 15 and 16 respectively, are mounted between three races with toroidal surfaces; the end races are numbered 11 and 12 respectively, while the center-race is numbered 14. The rollers 15 and 16 are mounted in tiltable yokes, 17 and 18 respectively, which are more clearly seen in Fig. 2. The yokes of the three rollers belonging to one set are interconnected by bevel gear segments 60, and the pivotal pin of one of the yokes is provided with an extension 62, forming a crank; tilting this crank will then change the angular position of all three rollers simultaneously.

A shaft 10 supports all three races, 11, 12 and 14, so that each race is free to rotate with respect to the shaft 10. The end races 11 and 12 are provided with bushings 13 and 13' and the center race has a bushing 29. On the left side, the shaft 10 is provided with a flange 8, which forms the support for a damper-disc 3; this damper disc in turn supports the race 11, and is made of suitable material, as will later be more fully explained. On the right side, the shaft 10 is splined, as indicated at 34, and slidably mounted thereupon is a flange 32, which forms the support for the damper-disc 3'; this disc 3' in turn bears against the race 12. The disc 3' is of the same material as disc 3. Fastened to the flange 8 is a gear 7, which is the sun-gear of a planetary system. The ring-gear 6 is mounted rotatably upon the race 11 by means of a ball bearing 22, and has on its other end a bevel gear 24. The center race 14 is provided with a similar bevel gear 25, and these two bevel gears are in mesh with a bevel idler gear 27. A ballbearing 28 supports the idler 27 from the frame 19, which also serves as a support for the tiltable yokes 17 of the rollers 15. The pinions 5 of the planetary system are mounted on pins 4 by means of bushings 56. The pins 4 are carried by a disc 2, which forms an integral part or is connected to the driving shaft 1. Suitable ducts 23 provide the necessary lubrication to all parts. The disc 2 also carries a helical gear 26, which drives an oil pump for lubrication and other purposes; the pump is not shown.

The frame 19 of the rollers 15 is held in the housing 57 against rotation, and has on its right side end a splined connection 31 with the frame 30 of the rollers 16, so that the frame 30 can move axially with respect to the frame 19. The frame 19 is provided with a hub 20, with bushing 21, to provide a bearing for the shaft 10.

To the right of the flange 32 and axially spaced therefrom is a plate 35; interposed between the flange and the plate are rollers 36, which serve as a thrust bearing, so that the flange 33 and the plate 35 can move angularly with respect to each other, upon the bushings 38. The outside of the plate 35 is provided with gear teeth 37, which mesh with a gear 52. The right side of the plate 35 is provided with a set of V shaped, or with helical grooves, or cams, indicated at 42; these cams, together with opposing cams 42' and interposed rollers 40 operate as a torque loading device. The cam angle, or lead of the helix, are substantially constant. A cage 41 holds the rollers 40 in their proper position. The cams 42' are connected to or form part of the flange 39, which has a hub-like portion provided with splines that engage the splines 34 of the shaft 10. A nut 44 serves as an adjustable abutment for the flange 39. Springs 45 bear against the outer part of the flange 39 and push it to the left side.

The output shaft 47 is suitably journalled in bearings 65 and has a bell shaped, splined extension 48. Slidably mounted thereon is a gear 49, which is provided with a collar 51, and with internal teeth 43. When the gear 49 is in the position shown in the drawings, the internal teeth 43 are in mesh with the gear 37, and this is the position of forward speed. If the gear 49 is moved toward the right, it first disengages the gear 37, and this is the neutral position. Still further shifting toward the right side will bring the gear 49 in mesh with an idler gear (not visible), and through the idler gear with the gear 53. Since gear 53 is connected with gear 52, and both are rotatably mounted upon the shaft 54, this will cause the output shaft to rotate in opposite direction; this last position therefore is the reverse drive.

Operation of the input shaft 1 through an engine will cause the engine torque to be divided by the action of the planetary system 5—6—7, into two parts, according to the ratio of the wheels 6 and 7. The portion delivered to the gear 7 is further transmitted to the shaft 10 and from there through the torque loading device 39—40—35 to the output shaft 47. Therefore, the elements 5, 7, 8, 10 and the torque loader 39—40—35 form a power transmission line bypassing the double toric roller system, and it is found that the axial pressure created by the torque loader under the influence of this power will be proportional to the load carried by the by-pass elements. This is an important feature of my invention, as will later be pointed out more fully, because it provides an axial pressure component acting upon the race and roller system, which is independent from the load transmitted from the output races to the output shaft, and which pressure component does not change when the ratio is changed. A further inspection of the drawing will disclose, that for a given engine HP, the power transmitted through the by-pass elements will increase with the speed of the output shaft, which is also the speed of the by-pass shaft 10. Therefore, the greatest portion of the engine HP will be transmitted through the by-pass at maximum output speed, and the smallest portion at lowest output speed.

For a given ratio of the planetary system, and a given engine speed, the speed of the by-pass shaft depends upon the speed of the ring-gear 6 of the planetary system. If gear 6 is held stationary, the sun-gear 7 would rotate a little more than twice as fast as the input shaft 1, this for the relative dimensions given in the drawing; the gear 7 would also rotate in the same direction as the input shaft, and all the engine power will be transmitted through the by-pass shaft. If now the ring-gear 6 is allowed to rotate under the influence of that part of the engine torque transmitted to it, it will rotate in the same direction as the input shaft, and such rotation of gear 6 will slow down the rotational speed of gear 7. All three elements of the planetary system are then rotating in the same direction, whereby each of the gears 6 and 7 respectively transmit only a portion of the total power. The portion of the engine torque which is transmitted through the gear 6 is constant, but the portion of the engine power so transmitted increases with increasing speed of the ring-gear 6. Since gear 6 is connected to the bevel gear 24, this portion of power is transmitted through the gear 27 to the center race 14. Inspection of the drawing will show that the center race rotates in an opposite direction with respect to the ring-gear 6. The center race 14 drives through the rollers 15 and 16 the races 11 and 12 respectively, which therefore rotate in the same direction as the shaft 1, and tend to drive the shaft 10 to which they are connected. This driving power, delivered from the races to the shaft 10, is superimposed to the driving power which is delivered to that shaft by the gear 7 and flange 8, as above explained. It follows from these facts that the basic principle of this construction comprises two branch power transmitting lines, with a fixed ratio and a variable ratio respectively, each of which lines transmits a portion of the power from the input to the output shaft, so that the total power is always the sum of the power components transmitted by each of the two branches. This is one of the important features of this invention, because it avoids the formation of the so-called circulating power, or "back-feed power" which occurs in the differential type transmissions, that have been suggested as a means to improve the performance of friction transmissions.

Contemplation of the disclosed construction shows clearly that the fundamental operation remains unaltered, if the by-pass branch includes a fixed-ratio gear interposed between the sun-gear 7 and the shaft 10, so long as the shaft rotates in the same direction as before. Likewise, the gear 24—27—25 may be built with a ratio other than 1:1 as shown, and this gear train need not necessarily be of the bevel type. This specific design was chosen as an example for the purpose of convenience and also because it represents further advantages with respect to requirement of space, and others. However, it is quite obvious that many other means for the transmission of power from the ring-gear 6 to the race 14 could be substituted without changing the characteristic performance or the basic principle of the construction here disclosed.

This is also true with respect to the position of the planetary system, which need not be coaxial with the race and roller system; but it appears that the coaxial relationship here disclosed together with the special manner in which the center race is driven, has further advantages that shall now be pointed out.

Fig. 2 discloses that several, by way of example, two, idler gears 27 are positioned substantially symmetrical with respect to the axis of the transmission. Such an arrangement of the idler gears avoids any radial load upon the bearing 29 between the center race and the shaft 10, due to the absence of unbalanced forces; this bearing can therefore be of simpler construction than if it had to carry the full load. The disclosed construction has the further advantage of giving free access to both sets of the tilting rollers, in contrast to the known design where the center race of a double toric transmission is driven by a drum fully surrounding one set of rollers; likewise, both carriers 19 and 30 can be supported from the housing, a feature which also contributes to a simplified and more rugged design.

A further condition of importance which has to be considered in a transmission of this kind is the proper coordination of speed ratio and load, so that the most frequently used speeds correspond to the lowest proportion of load upon the race and roller system. For the purpose of conveniently explaining this relationship, the relation of the power transmitted through the roller system to the total engine power shall be called "load factor" and designated with "F". Furthermore, if the ratio of the planetary gear (ring gear to sun gear P. D.) is "p", and the total ratio of the transmission, that is input speed to output speed, is "R", we find by computation that $$F = 1 - \frac{R}{p+1}$$

It is evident from this formula, that the load-factor F of the roller system can never be greater than 1, and that for all practical purposes, it will be substantially smaller than 1. Theoretically it could reach 1, in case that R equals zero, which means that the output speed is zero. This cannot be realized, because this would require an infinitely great ratio in the roller system, as the races 11 and 12 would be at standstill while the race 14 would be driven at about twice engine speed. On the other hand, the load factor would be zero, if $p$ is infinitely great, which means, that either the ring-gear 6 must be infinitely great, or the sun-gear 7 must be zero; obviously, these conditions cannot be practically obtained, and therefore, the load-factor F is always, and under all conditions of ratio, less than 1. If a specific case is considered, for example a transmission of the relative dimensions as shown on the drawings, the following will be observed. The ratio of the roller system, that is the relation of the contact radius of race 14 to that of race 11, shall be termed $r$, and it will be found that the total ratio R is derived from the formula $$R = \frac{p+1}{1+\frac{p}{r}}$$

In order to simplify these considerations, it is assumed that the ratio of the planetary gear $p$ equals 1 (the correct value of the drawing is 1.25) this simplifies the formulae to $$R = \frac{2r}{r+1} \text{ and } F = 1 - \frac{R}{2}$$

With a roller system ratio $r$ running from 1:3 through 1:1 to 3:1, the total ratio R goes from 0.5:1 through 1:1 to 1.5:1. The load factor F goes correspondingly from 0.75 through 0.5 to 0.25 which means that at the highest output speed, the load upon the roller system is only 25% of the total, while at ⅔ of the maximum speed it is not more than half of the total; and even at the lowest speed, it does not exceed 75% of the engine power.

The losses in a transmission of this type consist of the losses in the roller system, in the reversing gear 24—25—27 and of the losses in the planetary system. The losses in the roller system can be assumed to be between 7 and 9% of the power transmitted by it, while the losses in the gears are very much smaller; furthermore, the planetary gear is rotating as a block, with no relative motion between the wheels, at a ratio of the transmission of 1:1, so that there are no losses due to the planetary gears in or around that speed. In order to compare conveniently the performance of this transmission with a roller transmission of the differential type, the total losses are computed on the basis of the load carried by the roller system only, and this is done by using as a basis of computation a "compound load," that is a load upon the roller system which appears slightly increased as compared with the actual load as defined by the factor F. By way of example, it is assumed that the total engine power is 100 H. P., and the compound load curve for the power-shunt transmission according to this invention is then given by the curve $a$ in Fig. 3. Assuming the losses in the roller transmission to be about 8% in the average, we find that the losses in this transmission run from 2.4 H. P. at high speed to 6.4 H. P. at low speed, or since the total power is 100 H. P., from 2.4 to 6.4%; at a speed of 66% of the top speed, the losses will be less than 4%. It is apparent that this transmission gives a very high efficiency in a ratio range from top speed to about ⅔ thereof, and this is an important advantage of this transmission, since this is the speed range most frequently used in a modern passenger car while operating under full engine power. Due to the fact that modern cars carry relatively little weight per horsepower, the low speed ratio of 1:3 or thereabouts are rarely used, and then seldom with full engine power; however, it is equally important that these low speed ratios are available at an efficiency that will not go much below 90%.

Comparing now this performance with that of a transmission using a double toric system that carries the full engine power at all times, we find that this not only requires greater dimensions for races and rollers, to withstand the heavier load, but on the same basis of comparison, that is a loss of 8% for the roller system, we find that although such a transmission has a satisfactory efficiency at low speeds, the losses are very great at high speeds. An energy equivalent to about 8 H. P. is transformed into heat and this heat must be dissipated; since it is between two and three times as much as in a standard gear transmission, additional means would have to be employed to prevent serious damage due to high temperatures. The transmission according to this invention does not require such additional means, and since the price of such constructions is an important factor, this feature of the new transmission is of vital importance.

The performance of the new transmission shall now be compared with a transmission of the so called differential type, in which a planetary system is combined with a roller system, so that at high output speeds the roller system carries only a small portion of the total power. One of the best known forms is that in which the carrier of the planetary wheels is connected to the output shaft, the ring-gear to the input shaft, and the sungear to one race of the roller system, while the other side of of the roller system is connected to the input shaft. If the divers ratios are designated in the same way as before, we find that the total ratio here is $$R = \frac{p-r}{p+1}$$

and the loadfactor $$F = \frac{p}{R(p+1)} - 1$$

An interpretation of this formula shows, that the load factor is indeed small at high speed ratios, but it also discloses a fact which has heretofore not always been recognized in its importance for an automobile transmission, that is that the load factor increases tremendously when the ratio decreases. By way of comparison, for a transmission giving the same total variation of speeds of 3 : 1 from the highest to the lowest, as considered in the previous example, the load upon the roller system at the lowest ratio is 230% of the engine power; in addition hereto, the planetary system transmits the sum of load plus the engine power, since the 230% load upon the roller system represents what is known as the "circulating power" of the differential system. If a compound load is computed using the same coefficients for individual losses as in the previous example, we find that the curve marked $b$ of Fig. 3 represents the compound load for the divers ratios.

The tremendous difference in the performance of the two types of transmissions becomes quite clear if these two curves are compared; at a speed of one half of the maximum, the load on the old differential type transmission is 2.5 times greater than that on the new transmission. For still lower ratios of speed, the load upon the differential system becomes so great that losses amount to 20% and more, which is quite unsatisfactory.

It has been explained above that the torque loading device is operated in the first place by the power transmitted through the by-pass, and superimposed thereto the power delivered from the roller system. This arrangement shows a very important improvement over the known arrangements of toric race and roller transmissions, where the axial pressure is proportional to the load transmitted by the roller system only, or the power delivered by the races. For the purpose of convenient comparison, and to the end that the improvement may be fully appreciated, the graph in Fig. 4 shows two curves, one of which, marked c shows the axial pressure for different ratios as it is generated in a transmission following this invention. The other curve, denoted d, indicated the axial pressure for the respective ratios, which is generated in a double toric race and roller system of the same size and carrying the same load, but equipped with a torque loading device of conventional design, with a constant cam angle. It must be noted, that this "overload" of the old design as compared with the new, as here contemplated, relates only to the torque loading device, and that the other "overload" previously contemplated as relating to the power-shunt system in comparison with the differential type transmission, is an entirely different matter and independent thereof. Therefore, in a differential type transmission with conventional torque load device, both these "overloads" will occur simultaneously, and this is the main ground that such attempts have hitherto failed.

The drawings of Fig. 1 shows that the races 11 and 12 are rotatably mounted upon the shaft 10, each having a bushing, 13 and 13' respectively. Between each race and its supporting flange, 8 and 32 respectively, is interposed a disc, 3 and 3' respectively, which are made of a material suitable to withstand the axial pressure and to provide the required amount of friction. They perform the plural duty of yieldable connection, shock and vibration damper and power limiting device. The friction is so selected, that under the axial pressure imposed upon the races and rollers at a given load, the power transmitting capacity of the discs 3 and 3' is somewhat greater than the amount of power transmitted by each of the races 11 and 12 at their normal coefficient of traction. Since these two races are transmitting power in parallel, each carries about one half of the power. If the power to be transmitted increases at a moderate rate, the axial pressure also increases at the same rate, and with it the transmitting capacity of the discs 3 and 3'. However, should there be a sudden increase in the load, such as a sudden acceleration of shaft 1, and therefore of shaft 10, the inertia of the races 11 and 12 will build up a resistance against this acceleration, which will exceed the power transmitting capacity of the damper discs 3 and 3'. The result is that the races 11 and 12 will yield or rotate relatively to the shaft 10, until the accelerative forces have become small enough to be transmitted by the normal capacity of the discs 3 and 3', or until the load increase has reached the torque loading device 35—40—39 and caused an increase of the axial pressure. If the races 11 and 12 were in a solid, or splined connection with the shaft, a shock accelerating the shaft would also accelerate the races, and the contacts between the races and the rollers would then be called upon to transmit the increased load without that the axial pressure had yet been sufficiently raised. A clear distinction must here be made between a load increase which is slower than the natural frequency of the transmission and such shocks that are faster. In the latter case, the shock reaches the roller contact before the torque loading device has had time to build up a pressure sufficient to transmit the increased load through the roller contact, and as a result, the roller slips upon the race. This is prevented by the yielding connection through the discs 3 and 3'.

This shock absorbing device can also be used to advantage in a single toric system, such as is shown in Fig. 5. The input shaft 71 drives through a key the coupling 83, which engages the sleeve 81. A torque loading flange 85 is splined to the sleeve 81 and is provided with cams of known design which cooperate with balls 86 and similar cams provided on the input race 73. Rollers 89 tiltably supported by yokes 88 transmit the power to the output race 74. This race 74 is mounted rotatably upon the output shaft 72, which has a shoulder 76, supporting a damper disc 75. The race bears against the disc 75 and the power is transmitted from the race to the shaft through the disc. The output shaft 74 is supported by the bearing 78 against radial and axial loads and at the other end by the roller bearing 84 against radial loads. The pressure of the torque loading device is taken up on the left side through the bearing 79, which also serves as a radial bearing for the sleeve 81. The friction of the disc 75 is so adjusted that with the axial pressure normally developed by the torque loading device, it will transmit the full power output of the transmission. The springs 87, which are arranged in series with the torque loading device, preserve a minimum of axial pressure at times when the torque loading device is not operating, and thereby provides a minimum power transmitting capacity for the disc 75. By the described construction, it is possible to make a transmission shockproof no matter from which side the shock originates, and although there is but one torque loading device. If the shock comes from the side of the input shaft, it first enters the torque loading device and generates a pressure which, provided the moment of inertia of the race 73 is sufficient with respect to its mass, will reach the contact point of the roller with the race earlier or at least simultaneously with the increase of the tangential force, so that no slippage will occur. On the other hand, a shock originating in the output shaft will put an additional load upon the yieldable friction connection through the disc 75, due to accelerative or decelerative forces between the shaft 72 and the race 74. These forces are proportional to the frequency (or "suddenness") of the shock and to the moment of inertia of the race 74. The contact between the roller 89 and the race 74 can transmit a tangential force somewhat greater than normal without an increase in axial pressure, dependent upon the "margin of safety" of the traction coefficient used in the transmission; and this additional power so transmitted to the torque loading device generates additional axial pressure, which in turn permits a proportional increase of the transmitted power; this cycle repeats itself until sufficient pressure has been built up. The delaying factor in this building up of the axial pressure in the contact points are the inertia of the race 73 and the rollers 89; both must be accelerated (or decelerated in order to create additional axial pressure by a relative movement of rotation between the race 73 and the flange 85. Moreover, the race 73 must be moved toward the right side in order to increase the pressure between the race and the rollers, the movement being the deflection under load. The rollers also must be moved, although somewhat less; the race 74 moves the least amount, since its mass is the greatest, and since it also has the additional mass of the shaft, which moves with the race. Small as these movements are, they require a definite time, as the force which is available to move these bodies is limited. It must also be observed that the combined moment of inertia of the race 73 and the rollers 89, in relation to the race 74, changes with the changing position of the rollers with different ratios. The moment of inertia is lowest for the highest output speed and has its maximum for the lowest speed ratio. Furthermore, the safety margin of the traction coefficient changes over the entire ratio range. All these factors have to be taken into account in selecting the material with a suitable friction coefficient for the damper disc 75, and in determining the inertia required in the race 74. For, as has been pointed out, the "build-up" of axial pressure occurs at a definite rate, which, although different for different ratio settings, can be determined as outlined for each ratio position. Any shock load with a build-up faster than that of the axial pressure would inevitably cause a break in the contact point between the race and roller. In order to prevent this, such a shock will cause the connection between the shaft 72 and race 74 to yield, that is, the accelerative or decelerative force due to the inertia of the race 74 must exceed the transmitting capacity of the disc 75, in order to dampen out the shock through slippage. If all other factors are given, this can be brought about by suitable selection of the inertia of the race 74, since for a given shock, the accelerative or decelerative force is proportional to the resisting inertia.

Another example of the application of the shock absorbing device in a double toric transmission is shown in Fig. 6. In this construction, the damper disc 96 is interposed between the two center races 92 and 93. Through a splined connection 97, the disc is driven from the gear 95, which may be assumed to correspond to the gear 25 in Fig. 1 and which may be driven in a similar manner as that gear. The two end races 90 and 91 are connected to the shaft 94 by means of a torque loading device, 104—106 and 107—105 respectively. The two sets of tiltable rollers, 100 and 101 respectively, are mounted in any known or convenient manner between the races so as to transmit power from one to the other. The center races are provided with a bushing 98 and rotate in a direction opposite to that of the shaft 94. The disc 96 is provided with grooves on its surfaces, indicated at 109, which divide the surface into small, waffle-like areas, in order to secure a uniform friction coefficient between the disc 96 and the races 92 and 93.

The operation of the shock dampening device is similar to that described in connection with Fig. 5. If a sudden load increase enters by way of the gear 95, the disc 96 will slip with respect to the races 92 and 93, due to their inertia, and thereby protect the roller contacts with the races from damage. In addition to this operation, the described construction performs here the function of an equalizer, which is important in double-toric transmissions. Relative rotary motion between the end races may be due to the operation of the torque loading device, in case these races are connected thereto, or it may be due to torsional deflection of the shaft, if the races are connected thereto, or to deflections in other parts of the transmission. If such relative movements occur quickly, they cannot be compensated by the creep in the contact points of the rollers and other means of compensation must be provided; in the construction now under consideration, this is done by allowing relative movement of the two halves of the center race. The disc 96 and its friction with the races are so dimensioned that it starts slipping before the roller contacts reach the limit of their margin of safety. In other words, the safety margin of the friction coefficient between disc 96 and races 92 and 93 is selected smaller than the margin of safety of the traction coefficient between the rollers and the races. This device also acts as an effective control for the distribution of the load between the two halves of the transmission. If an inequality of the load should occur due to a difference in the ratio setting of the rollers of one set against the other, then obviously the set giving the greater speed will take over the higher load; if now the disc 96 is so adjusted that it can transmit only a little more than the normal load, it will slip as soon as one of the races tends to carry substantially more than its share, and thereby prevent one half of the transmission loading the other. In the same time, the friction between the disc 96 and the races will effectively prevent oscillations or vibrations, or surging of the power between the two sets of rollers, which occasionally arise in equalizing system which have no dampening means.

It has already been explained in connection with Fig. 2 that the bevel gears 27 are arranged symmetrically with respect to the transmission axis. And while such position is shown in Fig. 2, it is obvious that the wheels 27 need not be in perfectly symmetrical position to attain the objective of this construction, that is, to avoid a great load upon the bearing between the center race and the shaft 10. Even an angle of 150° between the axes of the two gears 27 would give only a small load upon that bearing, whereas a single gear drive to the center race, such as has been proposed in the art, puts a considerable load on the bearing which then requires a separate sleeve and stationary supports therefore at both sides of the center races. In the present design, the radial load upon the bearing is so small that it can be carried by a bushing riding upon the shaft. The bearing provided at one side of the center race at 21 serves more to prevent vibrations of the shaft. The method of driving the center race through bevel gears which surround one of the end races has further advantages besides those mentioned. It improves the lubricating of the transmission parts and prevents losses through oil churning, which occur in designs using a drum surrounding one of the races and one roller set, which losses easily amount to several percent of the transmitted power. This drive further has the inherent feature of reversing the direction of rotation, causing thereby the output shaft to rotate in the same direction as the input shaft. In combination with a planetary system, such as shown in Fig. 1, the bevel drive carries a comparatively light load, thereby reducing the tendency to deflection and ensuing noise. It is obvious, however, that this improved drive for the center race can be used in connection with any double-toric transmission, whether or not it is combined with a planetary system, although this construction gives additional advantages in such combination; to cite one of them by way of example, it appears that in a transmission of the power-shunt-type as here described, the ring gear 6 will rotate at only 1500 R. P. M. for 3000 R. P. M. motor speed, when the ratio is set for high output speed, so that the bevel gears also will operate at this low speed; whereas in a normal double-toric transmission with the center race so driven, the bevel gears would rotate at 3000 R. P. M. under the same conditions. And this feature evidently helps to reduce wear, noise and losses during high speed operation, which is an important point in an automobile transmission as previously explained.

Fig. 7 shows an example of a single toric transmission built according to the basic principles of this invention with a power-shunt or by-pass to the roller system. Several other features have been embodied in this design, which will now be described. Instead of using a gear drive (meaning tooth-gears) for the planetary system and for the reversing gear which drives one of the races, friction roller systems with fixed ratio have been employed. The engine shaft 121 drives through the flange 122 and the pins 123 the planetary wheels 124, having the form of barrel shaped rollers. The rollers contact on one side with the rim 125 of a disc keyed to the shaft 10', and on the other side with a floating race 127. The race 114, rotatably mounted upon shaft 10' by a bushing 133, has on its left side a flat portion 128, which is opposite the flat portion of the floating race 127. Interposed between these flat surfaces are twin rollers 129—129' which can rotate freely upon their pins 130. A carrier 131, mounted rotatably upon the shaft 10', supports the pins 130 in a radial position. Twin rollers are used to increase the capacity of this drive without increase in the frictional losses. Since the ratio between the races 127 and 114 is 1:1, each roller will produce exactly this ratio, although the inner-most roller will rotate faster on the pin 130 than the outer roller 129.

When the carrier 131 is held against rotation around the shaft 10', the rollers 129—129' serve as a reversing gear which transmits power from the floating race 127 to the race 114, which latter therefore rotates in opposite direction to the shaft 10', upon the bushing 133. The tiltable rollers 16', the roller yoke 18 and the other toric race 12' are similar in their function and their manner of operation to the right half of the double-toric transmission shown in Fig. 1, so that a detailed description of their operation here can be omitted. In the same way, the damper disc 203' and the torque loading device corresponds to the same parts in Fig. 1, and their numbers are the same, with a' added for distinction; the output shaft 47 and the gear 49 of Fig. 1 have been omitted in Fig. 7, because they are supposed to be arranged in exactly the same way as shown in Fig. 1, and do not form a part of the particular features to be described in connection with Fig. 7. This is also true of the reverse gear and the other parts shown at the right end of Fig. 1. Anyone skilled in the art will find no difficulty to substitute these parts and understand their operation in connection with Fig. 7 as well as with Fig. 1.

The carrier 131 with its rollers 129—129' can be held stationary by means of a brake, indicated at 135—136 or it can be released at the will of the operator for free rotation. When released, it will enable the floating race 127 to rotate freely under the influence of the portion of the engine torque which is transmitted to it by the planetary wheels 124. In that case, no force is transmitted to the disc 125 and it remains at standstill. Applying the brake 135—136 will then slow down the floating race 127, which corresponds in its operation to the ring-gear 6 of Fig. 1, and thereby start rotation of the disc 125, which corresponds to the sun-gear 7 of the Fig. 1. The power-shunt or by-pass is formed in the same way as in Fig. 1 by the elements 124—125—10' and the torque loading device 39'—40'—35' while the power transmitted by the roller system 114—16'—12' is delivered in parallel thereto through the damper disc 203' and the flange 32'.

It is obvious from the foregoing, that the brake 136 may be utilized as a clutch, so that no separate clutch mechanism is needed between the transmission and the engine is required. It should be noted, that a single toric transmission of the type described, though simpler in design than the double-toric type previously discussed, will show less efficiency and require greater roller and race dimensions than the double-toric type.

It will be appreciated that the different aspects of this invention need not be used or applied in the combination here chosen for purposes of description, but that each of the several improvements may be used alone, except in such cases where the requirement for such combined application has been pointed out.

What I claim is:

1. A friction transmission comprising a driving element and a driven element, a plurality of rotatable surfaces in rolling frictional contact with each other, means responsive to the torque transmitted and adapted to impose upon said rolling contacting surfaces the pressure required to render them effective for the transmission of power from one of said surfaces to the other, means associated with at least one of said surfaces adapted to maintain a direct driving connection of sufficient capacity to transmit static and gradually changing torques and to break said driving connection under the influence of sudden torque changes of predetermined speed of change, said last named means being rendered effective by the aforementioned torque responsive means.

2. A friction transmission comprising a driving and a driven element, a plurality of rotatable surfaces in rolling frictional contact with each other, means responsive to the torque transmitted and adapted to impose upon said rolling contacting surfaces the pressure required to render them effective for transmission of power from one of said surfaces to the other, means associated with at least one of said surfaces adapted to maintain a direct driving connection of sufficient capacity for static and gradually changing torques and to break said driving connection under the influence of sudden torque changes of predetermined speed of change, said last mentioned means comprising an inertia mass of predetermined inertia moment connected to said one rotatable surface and a friction clutch having a working pressure proportional to the transmitted torque.

3. In a friction transmission, in combination, a pair of races mounted for relative rotation with respect to each other, said races having toroidal surfaces facing each other, a double race interposed between said pair of races and mounted for free rotation with respect thereto, said double race having a pair of toroidal surfaces opposing the first named toroidal surfaces, tiltable rollers mounted between said races in rolling frictional contact therewith, means capable of establishing a dampened yieldable driving connection with at least one of said toroidal surfaces, an inertia mass connected to said last named toroidal surfaces having a moment of inertia proportioned to cause the load upon said yieldable connection to exceed its load carrying capacity under the influence of a predetermined build-up-speed of the load imposed upon said transmission.

4. In a friction transmission, in combination, a pair of races mounted for relative rotation and relative axial movement with respect to each other, said races having toroidal surfaces facing each other, a double race interposed between said pair of races and mounted for free rotation with respect thereto, said double race having a pair of toroidal surfaces opposing the first named toroidal surfaces, tiltable rollers mounted between said races in frictional rolling contact therewith, means capable of establishing a dampened yieldable driving connection with at least one of said races, said means comprising a friction damper-disc adjacent to said race, an inertia mass for said race proportioned to break the yieldable driving connection to said race at a predetermined speed of load change, and means for creating an axial pressure to maintain the rolling frictional contact between said races and rollers and to render effective said yieldable driving connection.

5. In a friction transmission, the combination of a drive shaft; outer raceways mounted upon said shaft for relative rotational movement with respect to each other; inner raceways coaxially positioned between said outer raceways; power transmitting rollers mounted between said outer and inner raceways; means for causing a tilting movement of said rollers to change the ratio of speed thereof; a dampened yieldable connection comprising a friction member adjacent to the outer raceways; an inertia mass for each raceway proportioned to cause said connection to yield when the speed of load change exceeds a predetermined value; abutments for said friction members axially movable with respect to each other so as to exert pressure upon said friction members; and a torque loading device to impose an axial pressure upon said abutments and said raceways.

6. In a variable speed transmission, in combination, a driving shaft, a driven shaft, a planetary system having two orbit wheels and a carrier with planetary pinions mounted rotatably thereon, said planetary pinions meshing with said wheels, said carrier being connected to said driving shaft, means driven by one of said wheels adapted to form a fixed-ratio power transmitting line from said planetary system to said driven shaft, a variable-ratio race and roller system adapted to drive the driven shaft in the same direction as the said first named means, and means for driving said race and roller system from said planetary system whereby the wheels and the carrier of said system revolve in the same direction with respect to each other.

7. A variable speed transmission comprising a planetary system having wheels and planetary pinions meshing therewith; a reversing gear; a toric race and roller system; a torque loading device including cams movable relatively to each other; means connecting one side of the race and roller system through the reversing gear to the planetary system; means for transmitting torque from one of said wheels to one of said cams; means for super-imposing upon the same cam the torque from the other side of the said race and roller system; and means to impose a load upon the other cam.

8. In a friction transmission, the combination of a double-toric race and roller system having outer raceways and inner raceways and rollers therebetween; a ringgear in drivable connection with said inner raceways; intermediate gears meshing with said ring gear; a second ring gear meshing with said intermediate gears, and a bearing journalling said second ring gear coaxially and rotatably upon one of said outer raceways.

9. In a friction transmission, the combination of a planetary system having orbit gears, a double-toric race and roller system positioned coaxially thereto having outer raceways and inner raceways and rollers mounted therebetween; a ring-gear connected to one of said orbit gears and journalled upon one of said outer raceways coaxially therewith; and a plurality of idler gears positioned substantially symmetrical with respect to the axis of the raceways for transmitting power from said orbit gear to said inner raceways.

10. In a friction transmission, the combination of a drive shaft; outer raceways drivably connected to said shaft; inner raceways coaxially rotatable upon said shaft; tiltable rollers mounted between said outer and inner raceways; a pair of carriers for supporting the tiltable rollers positioned between said outer and inner raceways; a bevel ring-gear connected to the inner raceways; a plurality of idler bevel gears meshing with said ring-gear; and an outer ring-gear positioned coaxially with one of the outer raceways rotatable relatively thereto and meshing with the said idler gears.

11. In a friction transmission, the combination of a drive shaft; outer raceways drivably connected to said shaft; inner raceways rotatable coaxially upon said shaft; rollers mounted between said outer and inner raceways; carriers positioned between said raceways for supporting said rollers; means for holding said carriers against rotation around said shaft; a ring-gear positioned coaxially with and adjacent to one of the outer raceways; another ring-gear connected to the inner raceways; idler gears meshing with both said ring-gears and forcing them to rotate in opposite directions with respect to each other; and pivots for said idler gears supported by one of said carriers for the said rollers.

12. In a variable speed transmission, in combination, a driving shaft, a driven shaft, a planetary system driven by said driving shaft, means driven by said planetary system comprising a reversing gear and a variable speed race and roller system, said means being adapted to drive said driven shaft in the same direction in which said driving shaft is rotating, said reversing gear having a rotatable carrier with idler wheels mounted thereon that transmit power when the carrier is held stationary, by-pass means connected to said planetary system to be independently driven thereby and adapted to transmit power from the driving shaft to the driven shaft supplementary and in parallel to the power which is transmitted to the driven shaft by the first said means, and means to hold stationary and release at the will of the operator the said rotatable carrier of the reversing gear.

13. A variable speed transmission comprising a planetary system, having orbit gears; a reversing gear; a toric race and roller system having two end races and a center race positioned therebetween; a torque loading device including cams movable relatively to each other positioned laterally of one of the end races; means connecting said center race through the reversing gear to the planetary system; means for imposing a load upon one of said cams; means for transmitting torque from one of said orbit gears to the other of said cams; means for super-imposing upon this last named cam the torque from the said end races of said race and roller system, said last named means including a friction member adjacent to each of said end races to provide a dampened yieldable movement under predetermined load conditions for each of said end races independently of the other.

14. In a variable speed transmission, the combination of a driving shaft and a driven shaft; a double-toric race and roller system having end races and a center race; means for transmitting power from said end races to said driven shaft; means comprising an orbit gear adapted to drive the center race of said race and roller system; planetary wheels driven by said driving shaft and meshing with said orbit gear; and means comprising a second orbit gear meshing with said planetary wheels constructed and adapted to form a power bypass between said driving shaft and said driven shaft to transmit power in parallel to said race and roller system.

15. In a variable speed transmission, the combination of a driving shaft and a driven shaft; a double-toric race and roller system having end races and a center race; a torque loading device connected to said driven shaft and positioned laterally of one of said end races; means to transmit the torque of said end races to said torque loading device; means comprising an orbit gear adapted to drive the center race of said race and roller system; planetary wheels driven by said driving shaft and meshing with said orbit gear; and means comprising a second orbit gear meshing with said planetary wheels constructed and adapted to form a power by-pass between said driving shaft and said torque loading device to transmit power in parallel to that which is transmitted by said race and roller system.

16. In combination, a friction transmission having means providing a rolling frictional contact adapted to transmit a torqueload, a friction coupling constructed and arranged to transmit without slipping at least the same amount of torqueload as said means when a steady load is applied, and means comprising a rotatable inertia mass of predetermined moment of inertia operatively connected with said first mentioned means and said coupling whereby said rotatable inertia mass causes slippage of said friction coupling when a sudden change of the torqueload occurs.

RICHARD T. ERBAN.